Figure 1:
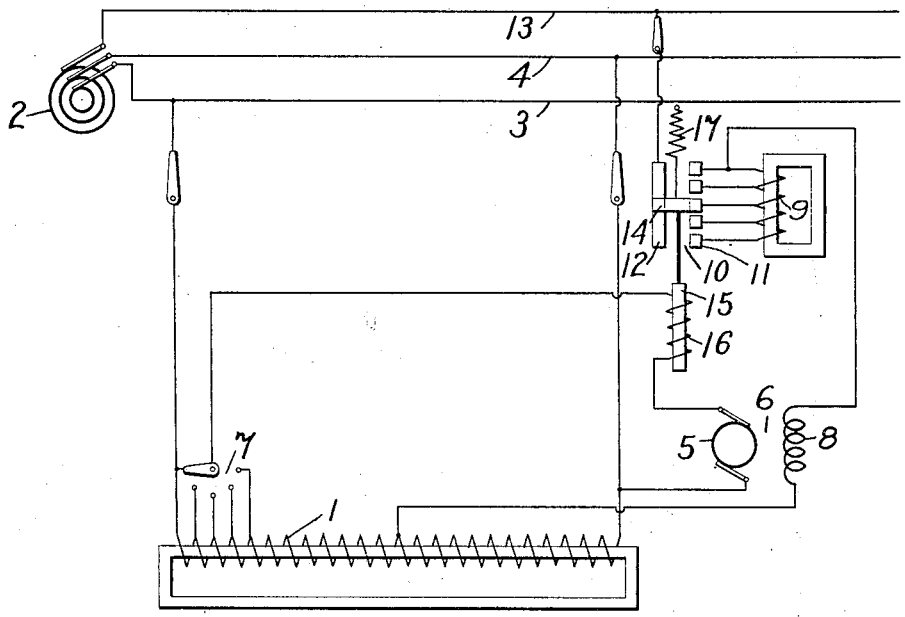

No. 839,936. PATENTED JAN. 1, 1907.
B. G. LAMME.
PHASE ADJUSTING APPARATUS.
APPLICATION FILED FEB. 6, 1905.

WITNESSES:
Fred. H. Miller
Otto S. Schairer.

INVENTOR
Benj. G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

PHASE-ADJUSTING APPARATUS.

No. 839,936.   Specification of Letters Patent.   Patented Jan. 1, 1907.

Application filed February 6, 1905. Serial No. 244,476.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Phase-Adjusting Apparatus, of which the following is a specification.

My invention relates to alternating-current motors of the commutator type of construction; and its object is to provide improved means for supplying energy to such motors from multiphase sources, whereby the proper phase relations of the currents traversing the armature and field-magnet windings for the most efficient and economical operation may be secured.

In general, motors of the commutator type of construction, if properly designed, may be operated efficiently by means of alternating currents, provided the currents in the armature and field-magnet windings reverse simultaneously, or nearly so. If the armature and field circuits of a motor of the commutator type having laminated magnetic circuits are supplied with alternating electromotive forces differing ninety degrees in phase, the currents in the armature and field-magnet windings may reverse nearly simultaneously. This is true because the current supplied to the field-magnet winding may be largely a magnetizing or wattless current which lags nearly ninety degrees behind the electromotive force impressed upon that circuit, while the armature-circuit may be and is ordinarily made with but little self-induction, so that the current in this circuit lags but little behind the electromotive force impressed upon it. It follows, therefore, that if the electromotive forces applied to the two circuits differ ninety degrees in phase the currents in the armature and field-magnet circuits differ but little in phase. It has been found in practice, however, that in order to obtain minimum armature-current for a given torque it is necessary that the currents in the armature and field circuits be more nearly coincident in phase than is the case if only the differences of the power factors of the circuits are depended upon to produce the proper relations. The insufficiency of the power-factor conditions of the circuits is partially due to the fact that the armature-circuit cannot be made entirely non-inductive. Moreover, when constant voltages are applied to the armature and field-magnet windings the amount of current in the field-magnet winding, as well as its phase relation with respect to the electromotive force applied to the winding, remains practically constant even under variations in the load upon the motor; but the amount of current in the armature-circuit varies according to the work which the motor is doing and the phase relations of this current with respect to the electromotive force applied to the armature-winding varies as the amount of current varies. Thus the phase relations of the currents in the armature and field-magnet windings with respect to each other vary as the work done by the motor varies. With no load on the motor—*i. e.*, with but small currents flowing in the armature-circuit—the phase relations may be reasonably close to what is desired; but as load is placed on the motor the phase relations with respect to each other of the armature and field currents change.

It is the purpose of this invention to provide means for effecting the proper adjustment of the phase relations of the armature and field magnetisms in order to obtain minimum armature-current for a given torque and approximately constant speed relations with given applied voltages regardless of the load upon the motor. This may be done by either of two methods—viz., by varying the phase relation of the field electromotive force with respect to the armature electromotive force in accordance with changes in load or by altering the phase relations of the current and electromotive force in the armature-winding or in the field-magnet winding, or in both.

My invention also provides means for deriving electromotive forces differing ninety degrees in phase from a three-phase source of energy and applying them, respectively, to the armature and field-magnet circuits of a motor of the type described. This may be done by connecting an autotransformer-winding between two terminals of a three-phase source and by connecting one terminal of one of the motor-circuits to the third terminal of the source and the other terminal to the middle point of the autotransformer-winding, the other motor-circuit being supplied from the autotransformer-winding. With this arrangement the electromotive force applied to the circuit, the terminals of which are connected, respectively, to one supply-conductor and to the middle of the transformer-winding, is substantially .867 of the potential difference existing between the other two supply-conductors, and the electromotive forces applied to the field-magnet and armature windings, respectively, differ in phase by ninety degrees. A variation or deviation from an exact quadrature relation may be obtained if circuit connection is made to other than the middle point of the autotransformer-winding.

My invention is illustrated in the accompanying drawings, in which—

Figure 2:
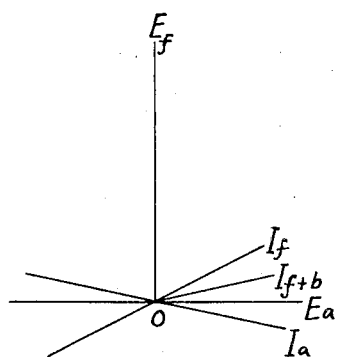
Figure 3:
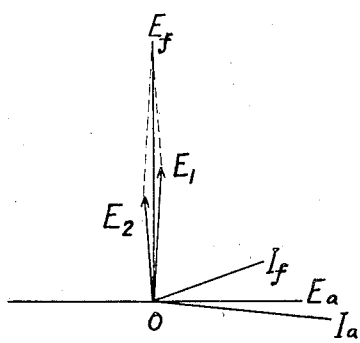

Figure 1 illustrates diagrammatically a motor and its controlling devices arranged in accordance therewith, and Figs. 2 and 3 are vector diagrams illustrative of the approximate phase relations of the currents and electromotive forces in the armature and field-magnet windings of the motor.

An autotransformer-winding 1 is supplied with energy from one phase of a three-phase generator 2, its terminals being connected to supply-conductors 3 and 4. The armature 5 of a motor 6 derives its energy from the autotransformer-winding 1, any suitable device, such as that shown at 7, being provided for the purpose of varying the voltage applied to the armature-terminals. One terminal of the field-magnet winding 8 of motor 6 is connected to the middle point of the autotransformer-winding 1 and its other terminal is connected to one terminal of an inductive resistance 9, which forms part of a regulating device 10 and which has a lower power factor than that of the field-magnet winding. Points in the inductive resistance 9 are connected to contact-terminals 11, and an adjacent conducting-strip 12 is connected to the third supply-conductor 13. A brush 14 is adapted to make sliding contact with the conducting-strip 12 and the contact-terminals 11, its operation being governed by the movement of a core 15, to which it is attached. An actuating-coil 16 for the core 15 is connected in series with the armature 5, and as a result the movement of the core is in accordance with variations in the amount of current traversing the armature-circuit. A spring 17 is provided for the purpose of opposing the magnetic pull of the coil 16 upon the core 15.

If the current in the armature-circuit increases, the brush 14 is moved so as to cut into the field-circuit more of the inductive resistance 9, and if the current in the armature-circuit decreases the spring 17 causes part of the inductive resistance to be cut out of the field-circuit.

It is of course understood that the controlling device 10 is illustrative of any suitable means for varying the inductance in the field-circuit substantially in accordance with variations in the amount of current in the armature-circuit, and that other devices for effecting this result may be employed within the scope of my invention.

An understanding of the approximate phase relations of the currents and electromotive forces in the armature and field-magnet windings under different conditions may be obtained from a consideration of Fig. 2. Lines $OE_a$ and $OE_f$ represent, respectively, the electromotive forces applied to the armature and field-magnet windings, and lines $OI_a$ and $OI_f$ represent the currents in the armature and field-magnet windings when the inductive resistance 9 is either wholly or partially cut out of the field-circuit. If an additional portion or all of the inductive winding 9 is cut into the field-circuit, the direction of the current in the field-magnet winding may be represented by the line $OI_{f+b}$. It will be observed that the currents represented by lines $OI_{f+b}$ and $OI_a$ are more nearly in phase than those represented by lines $OI_f$ and $OI_a$, and under these conditions the motor will operate more satisfactorily than under the phase relations represented by the lines $OI_f$ and $OI_a$.

By proper adjustment of the regulating device 10 it may be caused to operate so as to maintain the phase relations of the currents in the armature and field circuits approximately constant, regardless of variations in the amount of load, with given voltages applied to the motor-windings.

While I have shown specific means for effecting proper adjustment of the amount of inductance in the field-circuit, it is to be understood that any other suitable device may be employed for this purpose, the specific means here shown being only illustrative of a suitable device.

Thus far it has been assumed that the inductive winding 9 has a lower power factor than that of the field-magnet winding, a condition which is advantageous in that the maximum change of phase-angle between the field-current and its electromotive force may be effected when the power factors of the two windings differ most widely.

If the inductive resistance is so designed that its power factor remains approximately constant and equal to the power factor of the field-magnet winding with variations in its active length, which may be done by causing the electromotive-force drops resulting from the ohmic and inductive resistances in the winding 9 and in the field-magnet winding 8 to vary proportionately, then the speed of the motor may be varied by varying the active length thereof without materially affecting the phase relations of the armature and field-magnet windings.

The relations may be understood from a consideration of the vector diagram of Fig. 3, in which the lines $OE_f$ and $OE_a$ represent, as before, the directions of the electromotive forces applied to the field and armature circuits, respectively, and the lines $OI_f$ and $OI_a$ represent the phase relations of the currents in those circuits. Let the lines $OE_1$ and $OE_2$ represent, respectively, the directions and magnitudes of the electromotive forces required to overcome the impedances of the field-magnet and inductive windings. It is evident that the angle between the lines $OE_2$ and $OI_f$ must be greater than the angle between the lines $OE_1$ and $OI_f$ in order that the angle between lines $OE_f$ and $OI_f$ may be increased by the introduction of the whole or a part of the inductive winding into the field-circuit.

If the angles between lines $OE_1$ and $OI_f$ and between lines $OE_2$ and $OI_f$ are equal, the three electromotive forces $OE_1$, $OE_2$, and $OE_f$ will be in the same phase, and there will be no modification of the phase relations between the currents in the armature and field-magnet windings if only the values of these electromotive forces are varied without varying their phase relations.

Other means for and methods of adjusting the phase differences between the currents in the armature and field-magnet windings form the subject-matter of an application, Serial No. 244,482, filed jointly by Clarence Renshaw and myself, an application, Serial No. 244,481, filed by Clarence Renshaw, and applications, Serial Nos. 244,475 and 244,477, filed by myself, all of even date herewith.

I claim as my invention—

1. The combination with an alternating-current motor having armature and field-magnet windings and means for supplying electromotive forces differing in phase respectively thereto, of means for varying the phase difference between the current in the field-magnet circuit and the electromotive force applied thereto approximately in proportion to the amount of current traversing the armature-circuit.

2. The combination with a source of three-phase alternating-current energy and an electric motor having armature and field-magnet windings, of an autotransformer-winding having its terminals connected between two of the conductors from the source of energy and its middle point connected to one terminal of the field-magnet winding, means for connecting the armature-winding between any two points of said auto-transformer winding, an impedance device located in the field-circuit, and means for varying the amount of the impedance.

3. The combination with a source of three-phase alternating-current energy and an electric motor having armature and field-magnet windings, of an autotransformer-winding having its terminals connected between two of the conductors from the source of energy and its middle point connected to one terminal of the field-magnet winding, means for connecting the armature-winding between two points of said autotransformer-winding, an impedance device located in the field-circuit, and means for varying the amount of the impedance approximately in proportion to the amount of current traversing the armature-circuit.

4. The combination with an alternating-current motor having armature and field-magnet windings and means for supplying electromotive forces differing in phase respectively thereto, of means for bringing the currents in the armature and field-magnet windings approximately into phase with each other, by varying the amount of impedance in the field-circuit.

5. The combination with an alternating-current motor having armature and field-magnet windings and means for supplying electromotive forces differing in phase respectively thereto, of means for maintaining approximately constant phase relations between the currents in the armature and field-magnet windings by varying the amount of impedance located in the field-circuit approximately in proportion to the variations in the amount of current in the armature-circuit.

6. The combination with an alternating-current motor having armature and field-magnet windings and means for supplying electromotive forces differing in phase respectively thereto, of means for maintaining approximately constant phase relations between the currents in the armature and field-magnet windings by varying the amount of impedance located in the field-circuit substantially in accordance with variations in torque exerted by the motor.

7. The combination with an alternating-current motor having an armature-winding of low self-induction and a field-magnet winding of high self-induction, of an impedance in the field-circuit and means exterior to the motor for automatically varying the amount of the impedance.

8. The combination with an alternating-current motor having an armature-winding of low self-induction and a field-magnet winding of high self-induction, of an impedance device in the field-circuit and means for varying the amount of the impedance approximately as the amount of current traversing the armature-circuit varies.

9. The combination with an alternating-current motor having armature and field-magnet windings and means for supplying electromotive forces differing in phase respectively thereto, of an impedance device in the field-circuit and means for varying the amount of the impedance that is in circuit approximately as the amount of current traversing the armature-circuit varies.

10. The combination with an alternating-current motor having armature and field-magnet windings and means for supplying electromotive forces differing in phase respectively thereto, of an impedance device in the field-circuit having a lower power factor than the field-magnet winding and means for varying the amount of impedance included in said circuit.

11. The combination with an alternating-current motor having armature and field-magnet windings and means for supplying electromotive forces differing in phase respectively thereto, of an impedance device in the field-circuit having a lower power factor than that of the field-magnet winding and means for varying the amount of impedance that is in circuit approximately as the amount of current traversing the armature-circuit varies.

12. The combination with a source of three-phase alternating-current energy and a motor having armature and field-magnet windings one of which is supplied with energy from one phase of said source, of a transformer-winding that is connected to two of the supply-conductors from said source, the other motor-winding being connected between an intermediate point in said transformer-winding and the third supply-conductor, and an impedance device located in one of the motor-circuits.

13. The combination with a source of three-phase alternating-current energy and a motor having armature and field-magnet windings one of which is supplied with energy from one phase of said source, of a transformer-winding that is connected to two of the supply-conductors from said source, the other motor-winding being connected between an intermediate point in the said transformer-winding and the third supply-conductor, an impedance device located in one of the motor-circuits, and means for varying the amount of the impedance.

14. The combination with a source of three-phase alternating-current energy and a motor having armature and field-magnet windings one of which is supplied with energy from one phase of said source, of a transformer-winding that is connected to two of the supply-conductors from said source, the other motor-winding being connected between an intermediate point in the said transformer-winding and the third supply-conductor, an impedance device located in one of the motor-circuits, and means for varying the amount of the impedance in accordance with the amount of current traversing the armature-circuit.

15. The combination with an alternating-current motor having armature and field-magnet windings and means for supplying electromotive forces differing in phase respectively thereto, of an impedance located in field-magnet circuit, and means for bringing the currents in the armature and field-magnet windings approximately into phase with each other by varying the amount of said impedance.

16. The combination with an alternating-current motor having armature and field-magnet windings and means for supplying electromotive forces differing in phase respectively thereto, of an impedance located in the field-magnet circuit, and means for obtaining predetermined phase relations of the currents in the armature and field-magnet windings by varying the amount of said impedance.

17. The combination with an alternating-current motor having armature and field-magnet windings and means for supplying electromotive forces differing in phase respectively thereto, of an impedance located in one of the motor-circuits, and means for maintaining predetermined phase relations between the currents in the armature and field-magnet windings by varying the amount of the impedance in accordance with variations in the amount of current traversing the armature-circuit.

18. The combination with an alternating-current motor having armature and field circuits and means for supplying electromotive forces differing in phase respectively thereto, of means for varying the phase relations of the current and electromotive force of one circuit in accordance with variations of the corresponding phase relations in the other circuit.

19. The combination with an alternating-current motor having an armature-circuit possessing low self-induction, and a field-circuit possessing high self-induction, of an impedance located in the field-circuit, and means for varying the amount of the impedance.

20. The combination with an alternating-current motor having an armature-circuit possessing low self-induction, and a field-circuit possessing high self-induction, of an impedance located in the field-circuit, and means for varying the amount of the impedance in accordance with variations in the amount of current traversing the armature-circuit.

21. The combination with an electrical circuit of low self-induction and a circuit of high self-induction, of an impedance in the circuit of high self-induction, and means for varying the amount of the impedance in accordance with variations in the amount of current traversing the other circuit.

22. The combination with an alternating-current motor having armature and field-magnet windings, and means for supplying electromotive forces differing in phase respectively thereto, of an impedance device in the field-circuit having a different power factor from that of the field-magnet winding, and means for varying the amount of the impedance included in said circuit.

23. The combination with an alternating-current motor having armature and field-magnet windings, and means for supplying electromotive forces differing in phase respectively thereto, of an impedance device in the field-circuit having a different power factor from that of the field-magnet winding and means for varying the amount of the impedance that is in circuit in accordance with variations in the amount of current traversing the armature-circuit.

In testimony whereof I have hereunto subscribed my name this 3d day of February, 1905.

BENJ. G. LAMME.

Witnesses:
 OTTO S. SCHAIRER,
 BIRNEY HINES.